United States Patent [19]

Brocksieper et al.

[11] Patent Number: 4,856,105
[45] Date of Patent: Aug. 8, 1989

[54] METHOD AND APPARATUS FOR MAKING PISTON RINGS

[75] Inventors: Manfred Brocksieper, Hückeswagen; Rolf Lückger; Hans-Gerd Kröschel, both of Cologne; Jochen Stechow, Leichlingen, all of Fed. Rep. of Germany

[73] Assignee: Goetze AG, Burscheid, Fed. Rep. of Germany

[21] Appl. No.: 99,951

[22] Filed: Sep. 23, 1987

[30] Foreign Application Priority Data

Sep. 24, 1986 [DE] Fed. Rep. of Germany ....... 3632346

[51] Int. Cl.[4] .......................... G06F 15/46; B23B 5/26
[52] U.S. Cl. ............................. 364/474.02; 29/156.63; 82/19; 82/118; 364/474.29
[58] Field of Search ................ 364/474, 475, 167, 171; 82/1 C, 2 B, 18, 19, 46, 47, 48, 21 B; 29/156.5, 156.6, 156.62, 156.63; 318/570, 571, 572; 408/3, 8–13; 409/79, 80

[56] References Cited

U.S. PATENT DOCUMENTS

| 4,250,779 | 2/1981 | Feller et al. | 82/2 B X |
| 4,366,543 | 12/1982 | Feller et al. | 364/474 |
| 4,406,192 | 9/1983 | Wada | 82/19 |
| 4,461,067 | 7/1984 | Weissing et al. | 29/156.6 X |
| 4,463,487 | 8/1984 | Raggi | 82/40 R X |
| 4,679,472 | 7/1987 | Feller et al. | 82/19 |
| 4,683,787 | 8/1987 | Link | 82/18 |

Primary Examiner—Joseph Ruggiero
Attorney, Agent, or Firm—Spencer & Frank

[57] ABSTRACT

A method of making self-tensioning rings, including the steps of circumferentially machining an out-of-round ring blank on inner and outer surfaces thereof and subsequently cutting a ring segment out of the ring for obtaining a ring gap therein; measuring a circumferential contour of the ring subsequent to the machining step; and calculating the circumferential length of the ring segment and a cutting angle for removing the ring segment from the ring as a function of data obtained in the measuring step.

5 Claims, 2 Drawing Sheets

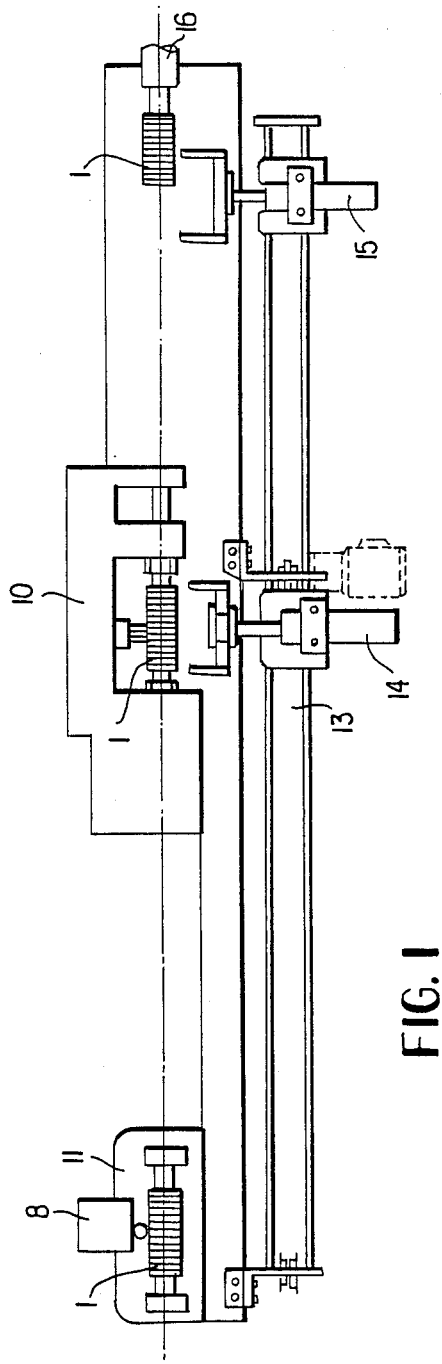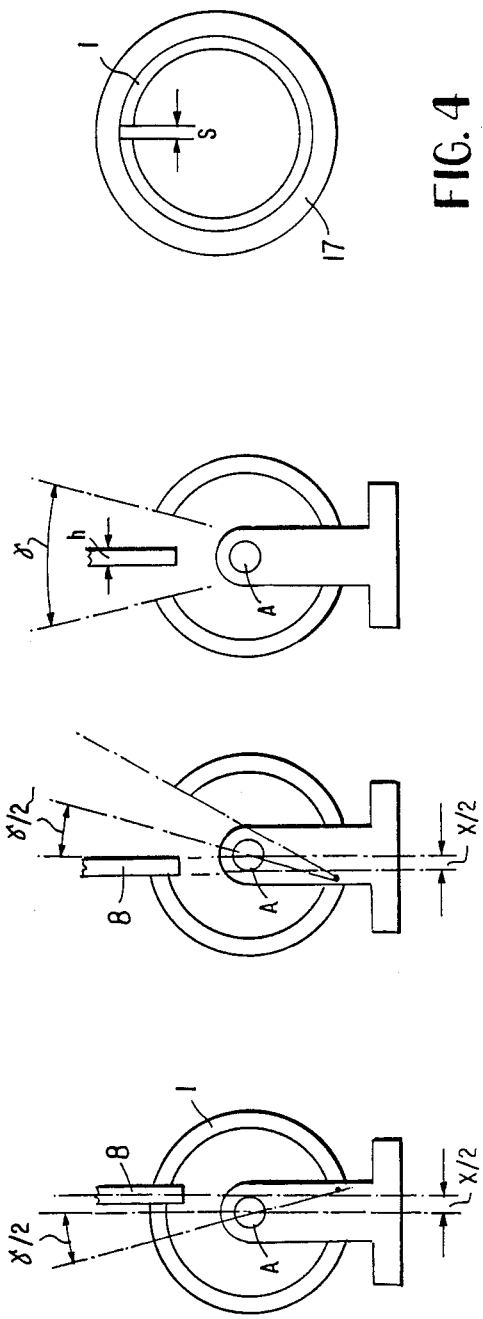

METHOD AND APPARATUS FOR MAKING PISTON RINGS

BACKGROUND OF THE INVENTION

This invention relates to a method of making selftensioning rings, particularly piston rings, wherein out-of-round blanks, preferably assembled in a stack, are first machined at the inner and outer circumferential faces, and thereafter a segment is removed from the rings to obtain a ring gap.

The invention also relates to a machine for performing the method outlined above. For controlling the radial feed motions of the turning (lathe) tools as a function of the desired circumferential contour, the machine has cams which rotate synchronously with the workpiece holding spindle as well as a linkage mechanism operatively connected with the cams.

It is generally known, for purposes of machine utilization, to work simultaneously on the internal and external circumferences of piston ring blanks with only one machine and to subsequently sever the piston rings in a severing station and thereafter submit them to a final machining while they are clamped such as to present a circular configuration. For the circumferential machining lathes are used which have a tool carrier whose radial feed motion is controlled by cams that rotate synchronously with the work spindle. For an accurate shaping these machines must operate in an extremely accurate manner. Such a manufacturing method further presupposes correct copying cams and a high degree of uniformity and a stress-free condition of the ring blanks to be machined. These conditions cannot always be met and therefore a subsequent machining of the cut-open and circularly clamped piston rings is necessary, that is, the rings are first turned to a diameter which is slightly larger than the desired diameter and during subsequent machining they are turned again and shaped circularly to the desired diameter.

It is further known, as disclosed in U.S. Pat. No. 4,366,543, to determine, by means of a scanning device, the actual out-of-round contour of a piston ring after machining, for the purpose of comparing such contour with a desired contour to effect correction in the out-of-round machining.

It is of importance that after cutting open the piston rings and during circular clamping thereof a parallel gap is obtained in the control ring. For this purpose the piston ring has to be cut open at a defined angle. The extent of cut is obtained from the piston ring contour of the out-of-round piston ring. In conventional cutting machines the setting of the cutting angle is determined empirically. Such a process largely depends from the skill of the operating personnel and requires a plurality of cutting tests. As dimensional criterion the piston ring gap in the control ring as well as the small and the large piston ring diameters are used. Because each diametral difference results in a gap width with a $\pi$-factor, the cut can be effected only with a predetermined undersized gap width. Such a gap width tolerance has to be maintained at a relatively large value in order to avoid a continuous subsequent adjustment at the cutting machine. The result is that a further work step is necessary to obtain the desired gap width.

SUMMARY OF THE INVENTION

It is an object of the invention to provide the possibility of an accurate motorized setting in a ring cutting machine, while taking into consideration the piston ring contour, for improving the accuracy of the ring clearance and for eliminating the additional "gap cutting" step.

This object and others to become apparent as the specification progresses, are accomplished by the invention, according to which, briefly stated, the contour of the piston rings is sensed after machining and the width of the ring segments to be cut out to obtain a ring gap is calculated as a function of the previously measured ring contour.

By virtue of the process according to the invention as outlined above, an individual cutting measure (individual gap cutting data) is obtained for the piston ring. Preferably, the piston ring contour is determined at four measuring points distributed circumferentially, that is, in the zones of the small and large axes, and the data are applied to a computer for calculating the cutting dimensions. The reduction to four measuring points permits a rapid determination of the piston ring contour with sufficient accuracy.

For reducing the tooling periods, according to a further feature of the invention, the rotary motion and setting motion of the piston rings are, as the measures for the width and the cutting angle for the segment to be removed, effected by means of drives controlled by the computer. In this manner a completely closed regulating circuit is obtained which needs no manual operation.

In the method according to the invention, in the receiving station the piston rings are moved while the cutting tool is stationarily held. In principle, however, a motion of the cutting tool with respect to a stationarily held piston ring stack or a motion of both the piston ring stack and the cutting tool is feasible.

As an additional advantage of the invention there is provided the possibility of utilizing the determined actual data of the circumferential contour of the piston ring for comparison with a previously established desired contour to control the tool for the circumferential machining as a function of the deviations from the desired values.

The measurement of the piston ring contour is effected in the axially clamped condition of the piston ring after the circumferential machining. In this manner a true piston ring diameter is measured so that an undefined distortion of the piston ring geometry by a decay of the self-tensioning after releasing the piston ring cannot adversely affect the measuring results. As a result, an improved trend analysis computation of dimensional deviations may be performed which originate solely from the tool wear and the imprecise setting of the copying apparatus.

BRIEF DESCRIPTION OF THE DRAWING

FIG. 1 is a schematic plan view of a machine assembly for working on piston rings according to the process of the inventon.

FIGS. 3a, 3b and 3c are schematic end views of a ring-gap cutter illustrated in three subsequent operational phases.

FIG. 4 is a schematic end view of a control ring and a piston ring held radially compressed therein.

DESCRIPTION OF THE PREFERRED EMBODIMENT

Figure 2:
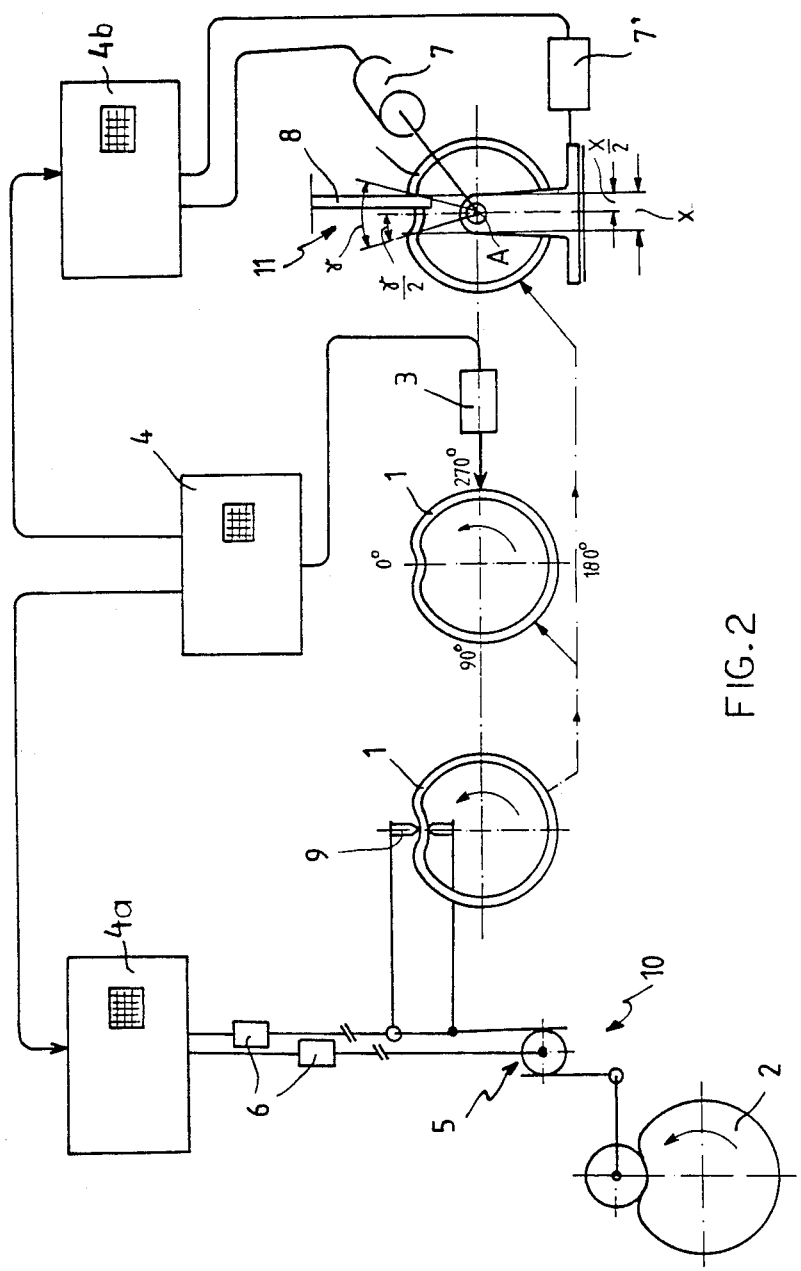
FIG. 2 illustrates in a flow chart diagram the steps of a preferred embodiment of the invention.

The apparatus shown in FIG. 1 comprises a copying lathe 10, a cutting station 11, and a guide track 13 connecting the lathe 10 and the station 11 with one another. On the guide track 13 there are arranged clamping jaws 14, 15 with which the piston rings 1 are withdrawn from a sorting station 16 and are advanced to the copying lathe 10.

The machining operation is performed simultaneously on a plurality of piston rings which, for this purpose, are conventionally supported as a piston ring stack in the copying lathe 10. In the description which follows, the invention will be described in conjunction with FIG. 2, with reference to a single piston ring 1.

First, the piston ring blank 1 is clamped in the copying lathe 10 and is given the contour of the cam 2 which rotates synchronously with the work spindle supporting the ring blank 1. After machining of the piston ring 1 and while it remains axially clamped on the copying lathe, a measuring scanner 3 contacts the piston ring as the latter rotates, still clamped to the copying lathe 10.

While the piston ring is caused to rotate at creeping speed, the measurement is executed in the following manner: the measuring scanner 3 follows the entire piston ring contour. The characteristic values at defined measuring points of 0°, 90°, 180° and 270° are applied to a digital computer (personal computer) 4 as these data are released dependent upon the angle of rotation of the main spindle of the lathe.

The measuring values of several piston rings or piston ring stacks to be machined sequentially are stored according to the trend of the totality of measuring values. If, as time lapses, a contour change appears, for example, because of tool wear, the computer 4 determines the required dimensional corrections. While taking into account the geometric relationships of the mechanical copying drive 5 and the utilized cam 2, setting corrections of the copying drive 5 are calculated based on the required geometric contours of the piston ring. These corrections are applied to a numeric control device 4a for numerically controlling two drives 6 of the copier 5. Simultaneously, the setting values for the cutting station 11 are calculated by the computer 4 and applied to a numeric control device 4b for numerically controlling drives 7, 7'. After the measuring values have been sensed, the piston rings 1 are, by virtue of the clamping jaws 14, transported from the copying lathe 10 to the cutting station 11.

Since the measuring values of the piston rings fluctuate for each piston ring or, as the case may be, for each piston ring stack, individual cutting data are calculated. Thus, as illustrated in FIGS. 3a, 3b and 3c, by means of the two NC-controlled drives 7, 7' the ring or the ring stack is turned about the ring center A through an angle γ (by virtue of drive 7) and further, the ring is displaced (by virtue of the drive 7') such that its axis of symmetry shifts towards the cutting plane by a distance X. As a result, the tool 8 having a width h, cuts from each ring 1 a defined ring segment so that all rings 1 to be machine have, in the control ring 17, as shown in FIG. 4, the same ring gaps, independently from diametral differences. The values of the angular rotation and the linear shift are obtained from the earlier-sensed measuring values in the copying lathe 10.

Since according to the invention all rings can be manufactured with ring gaps of identical size, it is no longer necessary to resort to the heretofore required, earlier discussed additional "gap cutting" step. Further, all operational steps are performed automatically whereby significant savings in the process expense are possible as compared to conventional methods.

It will be understood that the above description of the present invention is susceptible to various modificatons, changes and adaptations, and the same are intended to be comprehended within the meaning and range of equivalents of the appended claims.

What is claimed is:

1. In a method of making self-tensioning rings, including the steps of circumferentially machining an out-of-round ring blank on inner and outer surfaces thereof and subsequently cutting a ring segment out of the ring for obtaining a ring gap therein, the improvement comprising the steps of measuring a circumferential contour of the ring subsequent to the machining step; and calculating the circumferential length of the ring segment and a cutting angle for removing the ring segment from the ring as a function of data obtained in said measuring step.

2. A method as described in claim 1, wherein said measuring step comprises the step of measuring the contour at a plurality of circumferentially distributed points.

3. A method as described in claim 2, wherein said ring has a major axis and a minor axis; further wherein said measuring step comprises the step of measuring the contour at opposite ends of said major axis and said minor axis.

4. A method as described in claim 1, further comprising the steps of comparing data obtained from said measuring step with desired contour data and controlling tools for performing the circumferential machining step as a function of deviations of the measured data from the desired data.

5. An apparatus for making a split ring comprising
    (a) spindle means, including a spindle, for clamping and rotating a ring blank;
    (b) radial feeding means for radially moving a tool for effecting circumferential machining of said ring blank; said radial feeding means including
        (1) a cam arranged for rotation synchronously with said spindle and
        (2) linkage means including cam follower means for controlling radial feed motions of said tool;
    (c) scanning means for determining a circumferential contour of the ring after machining by said tool;
    (d) a cutting station including
        (1) a cutting tool;
        (2) moving means for rotating the ring in a circumferential direction about a ring axis and for displacing the ring transversely to the ring axis relative to the cutting tool; and
    (e) computer means arranged for receiving signals from said scanning means and for applying signals, as a function of the received signals, to said moving means for setting a cutting angle and a circumferential length of a ring segment to be cut out of the ring to obtain a ring gap therein.

\* \* \* \* \*